Dec. 19, 1922.
G. R. MAUPIN.
REAMER.
FILED NOV. 14, 1919.
1,439,567.
2 SHEETS—SHEET 1.
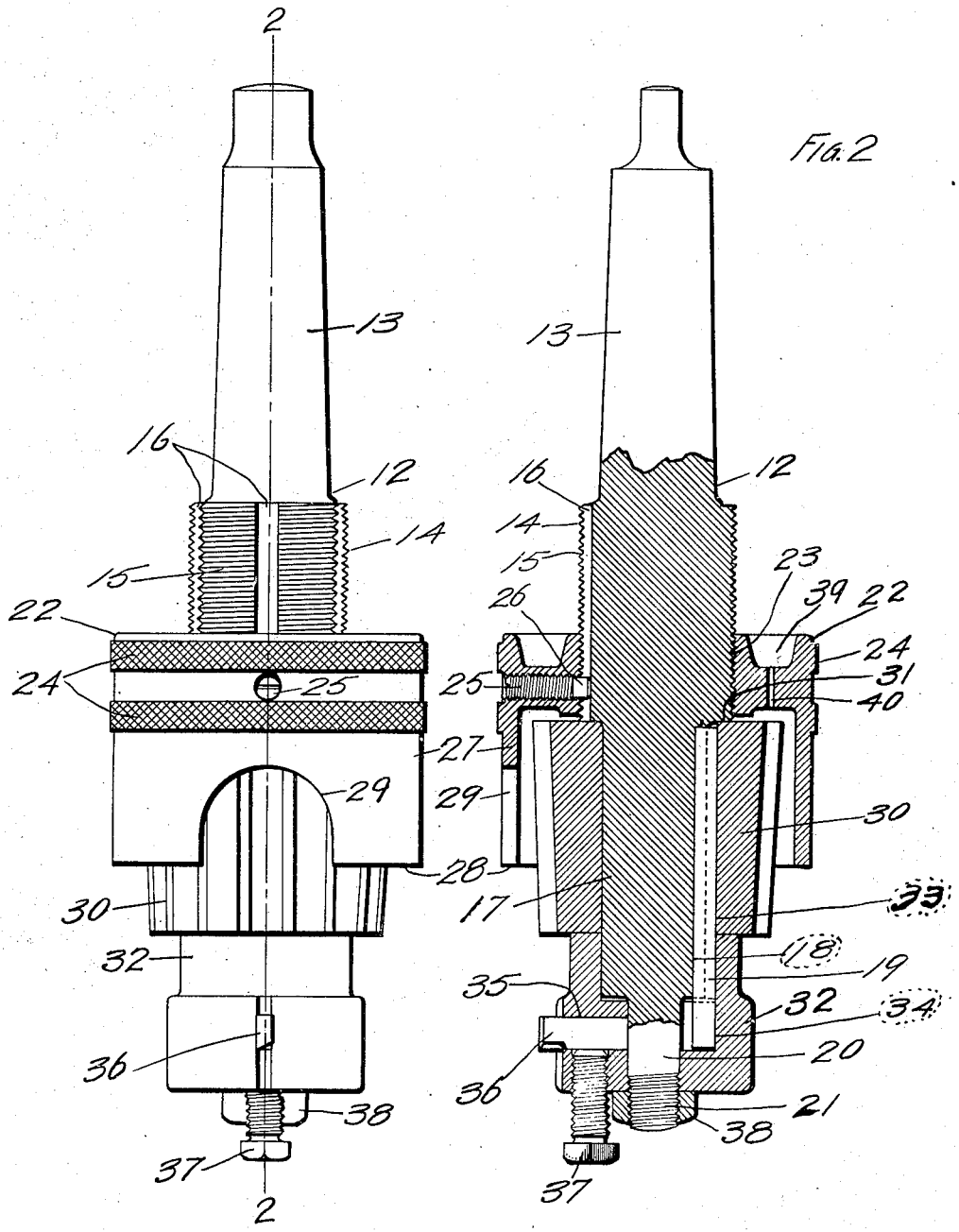
INVENTOR
GRAVES R. MAUPIN
By Edward E. Longan
ATTY.

Dec. 19, 1922.
G. R. MAUPIN.
REAMER.
FILED NOV. 14, 1919.
1,439,567.
2 SHEETS—SHEET 2.
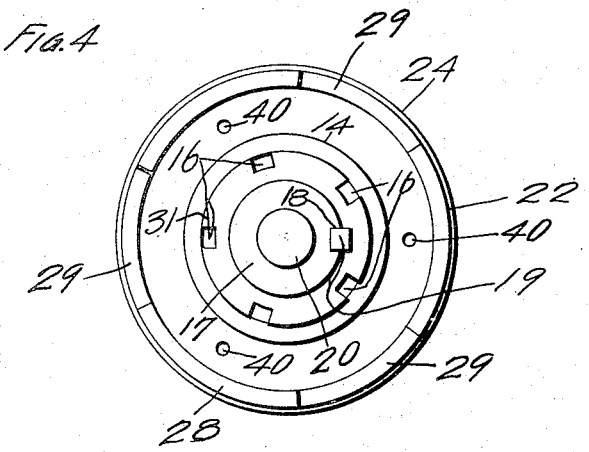
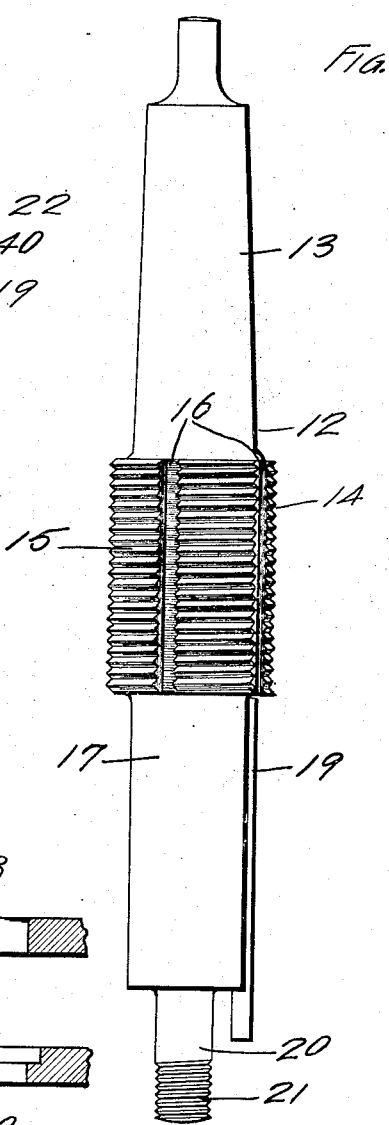
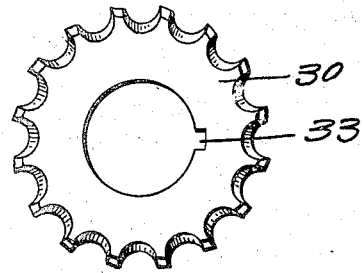
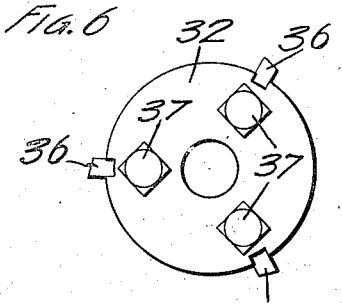
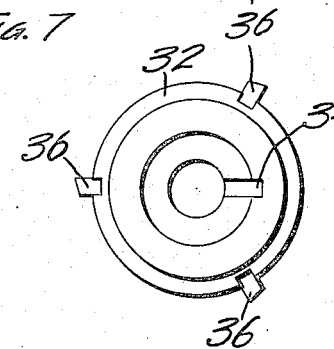
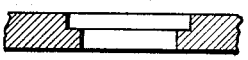
INVENTOR
GRAVES R. MAUPIN
By Edward E. Longan
ATTY.

Patented Dec. 19, 1922.

1,439,567

UNITED STATES PATENT OFFICE.

GRAVES R. MAUPIN, OF MOBERLY, MISSOURI, ASSIGNOR, BY MESNE ASSIGNMENTS, TO THE J. FAESSLER MANUFACTURING COMPANY, A COPARTNERSHIP COMPOSED OF JOHN W. FAESSLER, CHRISTINIA FAESSLER, LOUIS E. FAESSLER, AND GRAVES R. MAUPIN, ALL OF MOBERLY, MISSOURI.

REAMER.

Application filed November 14, 1919. Serial No. 337,941.

*To all whom it may concern:*

Be it known that I, GRAVES R. MAUPIN, a citizen of the United States, and a resident of Moberly, Missouri, have invented certain new and useful Improvements in Reamers, of which the following is a specification containing a full, clear, and exact description, reference being had to the accompanying drawings, forming a part hereof.

This invention relates to improvements in reamers, and has for its primary object to construct a reamer for reaming punched holes, which is provided with a boring head in advance of the reamer so that all of the strained metal may be removed from around the punched hole before the reaming operation is started.

A further object is to construct a reamer which will remove the strained metal from around a punched hole before the reamer proper starts operating, and to provide a gauge so that the diameter of the reamed hole may be accurately gauged and the reaming operation stopped when this diameter is reached.

A still further object is to construct a reamer having a boring head in advance of the reamer proper so that in case a cored hole in cast iron is to be reamed, the cutter head will remove the chilled and crude surface of the hole before the teeth of the reamer come in contact with the metal, thus saving the cutting edges of the reamer as well as frequent sharpening.

In the drawings:

Figure 1 is a side elevation of my device.

Figure 2 a longitudinal sectional view taken on the line 2—2 of Fig. 1.

Figure 3 a side view of the arbor made use of.

Figure 4 a bottom plan view with the reamer and cutter head removed.

Figure 5 is a bottom plan view of the reamer made use of.

Figure 6 a bottom plan view of the boring head.

Figure 7 a top plan view of the same.

Figure 8 a sectional view of a piece of sheet metal showing the hole therethrough as it comes from the punch press.

Figure 9 a similar view showing the hole after the cutter head has passed partially therethrough.

Figure 10 a similar view showing all of the strained metal removed from the punched hole, and Figure 11 a view of the hole when finished.

In the construction of my device, I provide an arbor 12, its upper portion 13 being tapered so as to fit within the spindle of a drill press.

Immediately below the tapered portion 13 I form a cylindrical portion 14, this portion being larger than the largest diameter of the portion 13, and is provided with screw threads 15 and longitudinal slots 16.

Below the cylindrical portion 14 is a second cylindrical portion 17, this being of less diameter than the portion 14, and is provided with a key way 18, in which the key 19 is secured. Below the cylindrical portion 17 is a third cylindrical portion 20, which is of less diameter than the portion 17, and its end is provided with threads 21.

Over the portion 14 is secured the gauge 22, which gauge is provided with a screw threaded portion 23, which engages with the threads 15 formed on the cylindrical portion 14. This gauge is provided with a pair of knurled bands 24, so that the same can be readily turned by hand for moving the same upon the threads.

Between the knurled bands 24 is placed a set screw 25, its end 26 being designed to enter the grooves 16 formed in the cylindrical portion 14, and is for the purpose of securing the gauge 22 against rotation.

The gauge 22 is provided with a downwardly projecting portion 27, thus forming virtually a hollow cylinder, this downward projecting portion acting as the gauge proper, so that the edge 28 coming in contact with the material to be reamed will prevent further entrance of the reamer.

This portion 27 is provided with openings 29, which not only allow the escape of chips, but also will allow the operator to observe when the gauge comes in contact with the material being reamed. This can readily be observed, as the edge 28 will have a tendency to scrape or brighten the surface of the material being reamed, and does so when it is in contact. This will prevent any tendency to buckle the plate, which might happen were the operator not able to see when the gauge comes in contact with the material.

Over the cylindrical portion 17 is slipped the reamer 30, the reamer in this instance being tapered and of the solid milled type, although I may also use a straight reamer or a reamer having inserted teeth.

This reamer is held against rotation by the key 19, and its upper edge abuts against the shoulder 31, formed by the difference in diameter between the cylindrical portions 14 and 17.

Over the lower portion of the cylindrical member 17 and over the cylindrical member 20 is slipped the boring head 32, this boring head as well as the reamer 30 being provided with key ways 33 and 34 so that they will pass over the key 19.

The cutter head is preferably provided with three openings 35, into which the cutters 36 are inserted. These cutters are held in position by means of set screws 37, and are for the purpose of removing the strained material from around a punched hole or removing the scale from a cored hole.

The reamer 30 and the boring head 32 are secured to the arbor 12 by means of the nut 38. On the upper surface of the gauge 22 I form the circular recess 39, this recess being for the reception of a lubricant or drilling compound, and formed in the bottom of this recess is a plurality of openings 40, these openings allowing the lubricant to drip directly upon the reamer, and from this on to the material being reamed or bored by the boring head. In this manner I am enabled at all times to supply constant lubrication to the cutting tools.

The operation of my device is as follows: After assembling the reamer and cutter head on the arbor, I place a ring gauge of the diameter of the hole to be reamed over the reamer. The gauge 22 is then revolved on the cylindrical portion 14 so as to bring it in contact with the ring. The screw 25 is then driven inwardly and seated in one of the grooves 16. I now insert the cutters 36 and set them so that they will project slightly beyond the smallest end of the reamer. The cutters 36 are then secured within the cutter head 32 by means of the screws 37, and the device is then ready for operation, and any number of holes can be reamed to the same size.

Another advantage in having the gauge 22 adjustable is that the reamer can be sharpened and the gauge so adjusted so as to allow the use of the reamer for a one size of hole until its largest diameter is reduced beyond that size.

In the drawings I have shown the grooves 16 as five in number, but this number may be increased or decreased according to the fineness of adjustment. This adjustment is achieved as follows; taking ten threads to the inch, it will be necessary to give the gauge ten complete revolutions in order to move it one inch along the cylindrical portion 14, one revolution moving it only one-tenth of an inch and with the five divisions as shown by turning it so that the screw 25 will enter the next slot from that in which it is seated, the gauge 22 will only be advanced or retracted one-fiftieth of an inch. Thus it will be seen that by increasing the number of grooves or by increasing the number of threads, a very delicate adjustment may be obtained.

Having fully described my invention, what I claim is:

A reamer comprising an arbor having a tapered portion and a plurality of cylindrical portions of different diameters, the cylindrical portion having the greatest diameter being provided with screw threads, and a series of parallel slots intersecting said screw threads, a gauge provided with an oil chamber screw seated on said screw threaded portion, a set screw carried by said gauge and adapted to be seated in said slots, whereby the gauge may be adjusted on said screw threaded portion and its adjustment predetermined, a reamer seated on said arbor and having one end resting against the screw threaded portion of said arbor and within the gauge, a cutter head, and means for holding the reamer and cutter head in position.

In testimony whereof, I have signed my name to this specification, in the presence of two subscribing witnesses.

GRAVES R. MAUPIN.

Witnesses:
 GEO. BESTEN,
 IDA DULANY.